(12) United States Patent
Gupta

(10) Patent No.: US 11,776,517 B2
(45) Date of Patent: Oct. 3, 2023

(54) HOLDER

(71) Applicant: Anil K. Gupta, Pittsburgh, PA (US)

(72) Inventor: Anil K. Gupta, Pittsburgh, PA (US)

( * ) Notice: Subject to any disclaimer, the term of this patent is extended or adjusted under 35 U.S.C. 154(b) by 257 days.

(21) Appl. No.: 17/212,231

(22) Filed: Mar. 25, 2021

(65) Prior Publication Data
US 2022/0310044 A1 Sep. 29, 2022

(51) Int. Cl.
*G10G 5/00* (2006.01)
*F16M 13/02* (2006.01)

(52) U.S. Cl.
CPC .............. *G10G 5/00* (2013.01); *F16M 13/022* (2013.01)

(58) Field of Classification Search
CPC ................................. G10G 5/00; F16M 13/022
See application file for complete search history.

(56) References Cited

U.S. PATENT DOCUMENTS

| | | | |
|---|---|---|---|
| 1,669,523 A * | 5/1928 | Isecoff ..................... | G10G 5/00 24/511 |
| 4,084,778 A | 4/1978 | Dominguez | |
| D316,000 S | 4/1991 | Logan et al. | |
| 5,372,346 A | 12/1994 | Upchurch et al. | |
| 5,911,396 A | 6/1999 | Birley | |
| 6,091,008 A | 7/2000 | Yu | |
| 6,204,440 B1 * | 3/2001 | Yu ........................... | G10G 5/00 84/421 |
| 6,231,018 B1 | 5/2001 | Barbieri | |
| 6,323,405 B1 * | 11/2001 | Yu ........................... | G10G 5/00 84/327 |
| 6,622,981 B1 * | 9/2003 | Hsieh ....................... | G10G 5/00 84/327 |
| 6,982,373 B1 * | 1/2006 | Yu ........................... | G10G 5/00 248/443 |
| 7,105,732 B1 * | 9/2006 | Hsieh ....................... | G10G 5/00 84/327 |
| 7,151,213 B2 * | 12/2006 | Hsieh ....................... | G10G 5/00 248/443 |
| 7,291,775 B2 * | 11/2007 | Yu ........................... | G10G 5/00 248/443 |
| 7,464,910 B1 | 12/2008 | St. Germain et al. | |
| 7,484,701 B2 * | 2/2009 | Hsieh ....................... | F16B 2/12 211/85.6 |

(Continued)

FOREIGN PATENT DOCUMENTS

| CN | 2328078 | 7/1999 |
|---|---|---|
| CN | 101131815 | 2/2008 |

(Continued)

*Primary Examiner* — Robert W Horn
(74) *Attorney, Agent, or Firm* — Alexander Pokot; AP Patents

(57) ABSTRACT

A holder includes a body defining two prongs joined with each other at proximal ends thereof, each prong from two prongs has a distal end. The holder defines a hollow interior defined by the two prongs and an opening between distal ends, the opening being in an open communication with the hollow interior. A pivot is provided on a distal end of one prong from the two prongs. A protrusion is provided on a distal end of another prong from the two prongs. A rigid retainer may be provided in a pivot connection at the pivot and in a detachable connection at the protrusion. The holder may be designed with a pivot to independently pivot about a mounting member in each of a vertical and a horizontal plane.

28 Claims, 10 Drawing Sheets

(56) References Cited

U.S. PATENT DOCUMENTS

| | | | |
|---|---|---|---|
| D609,940 S | 2/2010 | Samu | |
| D610,372 S | 2/2010 | Samu | |
| 7,717,377 B1* | 5/2010 | Corrado | G10G 5/00 248/150 |
| 7,757,869 B2 | 7/2010 | Lawson | |
| 7,775,491 B1 | 8/2010 | Samu | |
| 7,906,717 B2* | 3/2011 | Wang | G10G 5/00 84/327 |
| 8,020,817 B2* | 9/2011 | Yu | G10G 5/00 248/219.2 |
| D701,449 S | 3/2014 | Xiao | |
| D721,572 S | 1/2015 | Dias | |
| 8,925,890 B2* | 1/2015 | Liaw | G10G 5/00 248/443 |
| 9,366,275 B2* | 6/2016 | Simon | F16M 11/2014 |
| 9,607,592 B2* | 3/2017 | Chen | G10G 5/00 |
| 10,037,749 B2* | 7/2018 | Glasser | G10G 5/005 |
| 10,051,978 B2* | 8/2018 | Gupta | A47B 96/067 |
| 10,089,969 B1* | 10/2018 | Chen | G10G 5/00 |
| 10,332,493 B2* | 6/2019 | Moberg | G10G 5/00 |
| 10,900,606 B2* | 1/2021 | Gaines | G10G 5/00 |
| 10,984,769 B2* | 4/2021 | Spriewald | G10D 3/00 |
| 2006/0213351 A1* | 9/2006 | Hsieh | G10G 5/00 84/327 |
| 2007/0039446 A1 | 2/2007 | Samu | |
| 2008/0060498 A1 | 3/2008 | Samu | |
| 2008/0265116 A1* | 10/2008 | Chen | G10G 5/00 248/291.1 |
| 2010/0032535 A1* | 2/2010 | Elliott | F16M 13/00 248/229.22 |
| 2013/0206932 A1* | 8/2013 | Henry | G10G 5/00 248/289.11 |
| 2014/0175241 A1* | 6/2014 | Yang | G10G 5/00 248/274.1 |
| 2017/0292548 A1* | 10/2017 | Bitterlich | F16B 2/06 |
| 2018/0231173 A1* | 8/2018 | Slaton | G10G 5/00 |
| 2020/0402485 A1 | 12/2020 | Udofia | |
| 2022/0208154 A1* | 6/2022 | Carr | G10G 5/00 |
| 2022/0310044 A1* | 9/2022 | Gupta | G10G 5/00 |

FOREIGN PATENT DOCUMENTS

| | | |
|---|---|---|
| CN | 201536965 | 4/2010 |
| CN | 201630929 | 11/2010 |
| DE | 202006011519 | 12/2006 |
| DE | 202006018711 | 3/2007 |

* cited by examiner

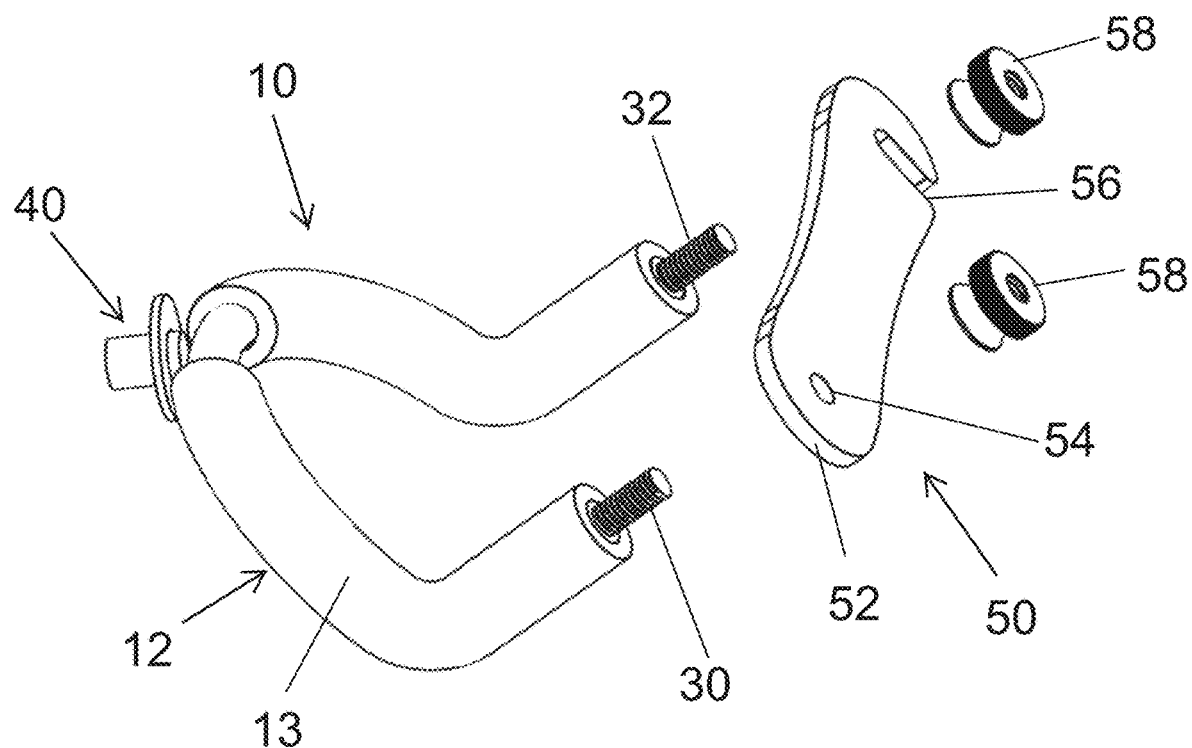
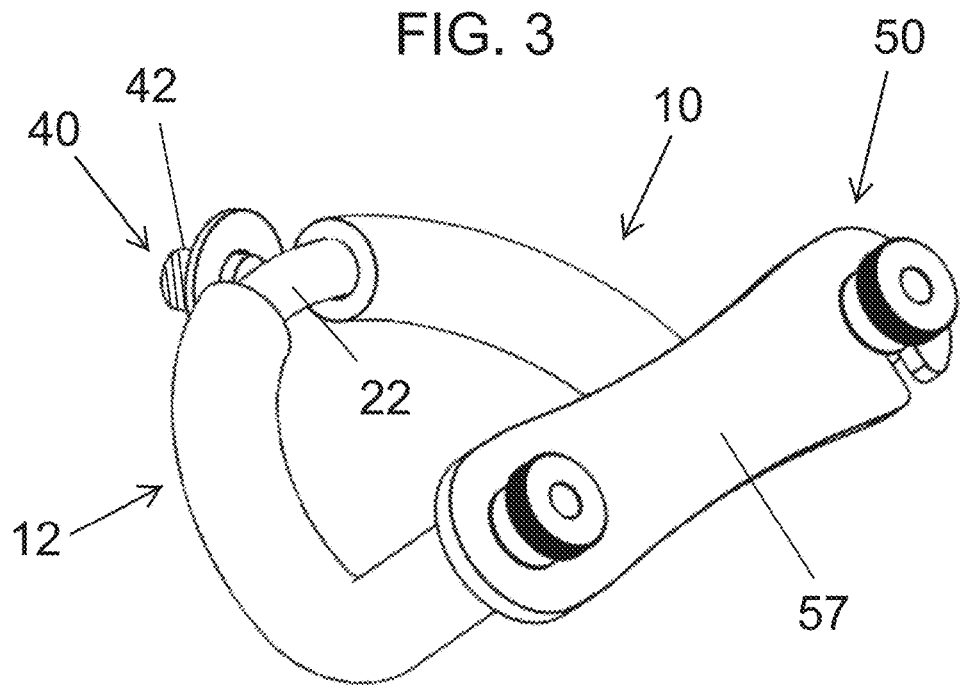

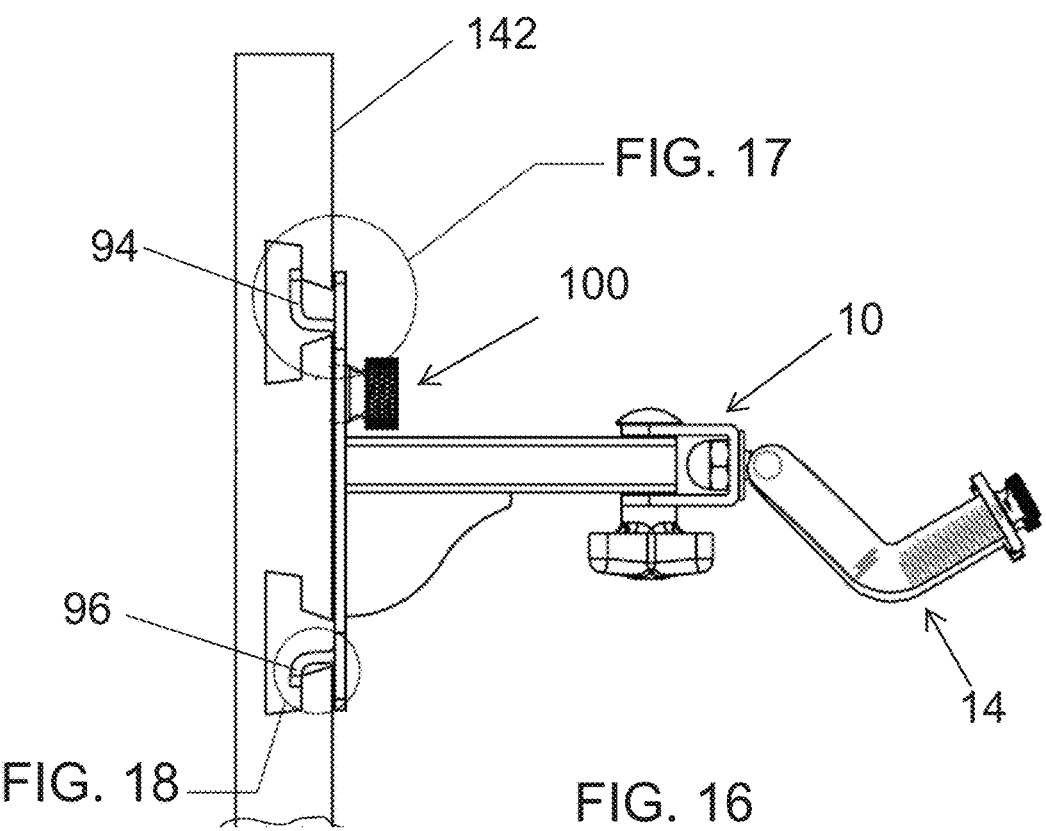
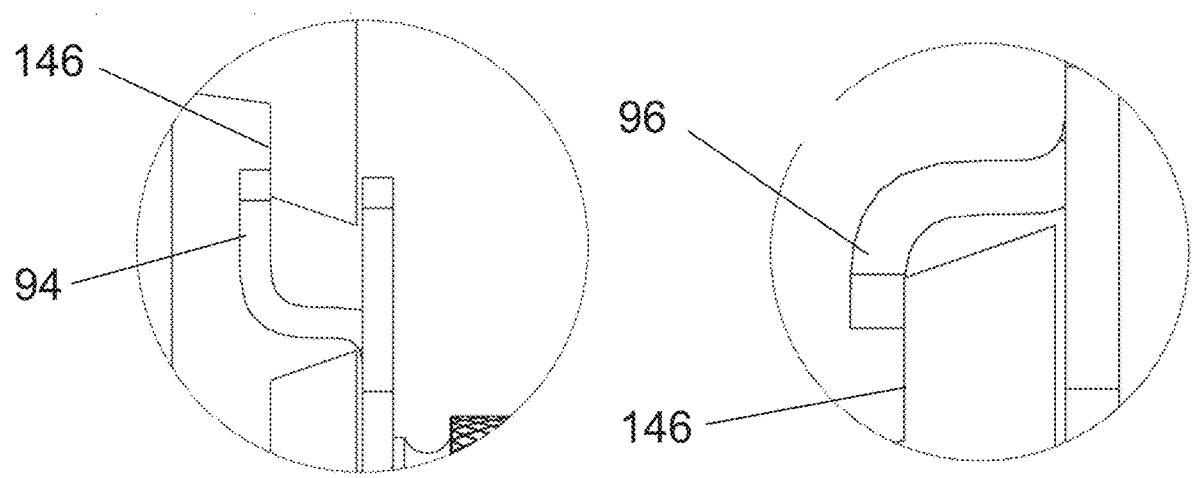

HOLDER

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to a holder. The subject matter may be related to a holder used to hold a string instrument on a vertical surface. Such subject matter may be related to a guitar hanger.

BRIEF DESCRIPTION OF THE DRAWINGS

The accompanying drawings are incorporated in and constitute part of the specification and illustrate various embodiments. In the drawings:

FIG. 3 illustrates a perspective view of a holder with a retainer, the retainer being detached from the holder;

FIG. 4 illustrates a perspective view of a holder with a retainer, the retainer being attached to the holder;

FIG. 16 illustrates an elevation view of the slatwall with the holder of FIG. 15;

FIG. 17 illustrates a partial enlarged view of the slatwall with the holder of FIG. 16;

FIG. 18 illustrates a partial enlarged view of the slatwall with the holder of FIG. 16;

DETAILED DESCRIPTION

Figure 1:
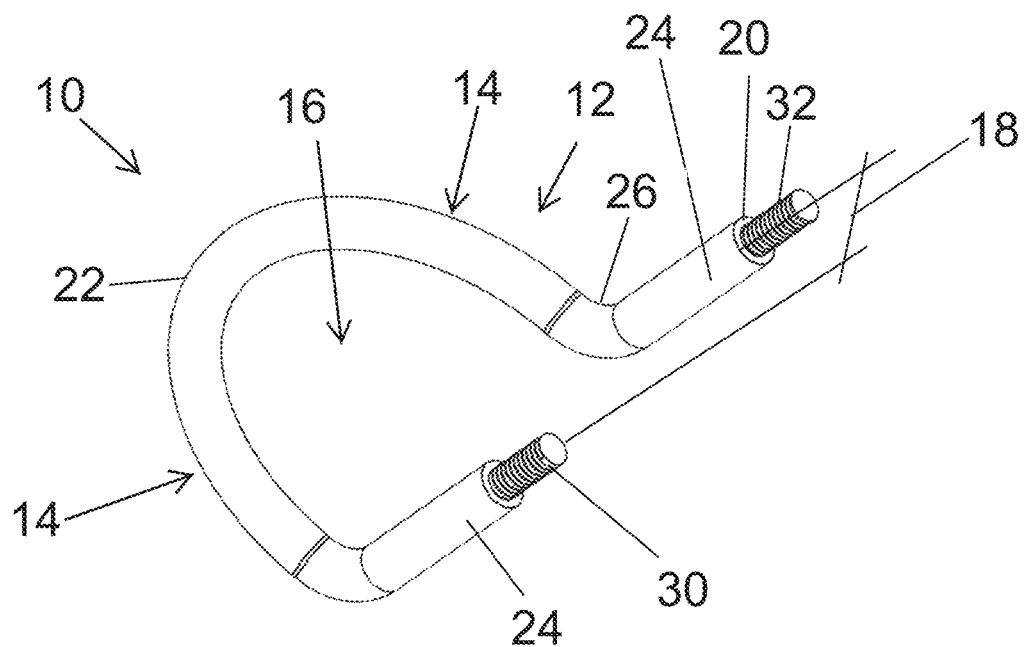
FIG. 1 illustrates a perspective view of a holder.

Prior to proceeding to the more detailed description of the present subject matter, it should be noted that, for the sake of clarity and understanding, identical components which have identical functions have been identified with identical reference numerals throughout the several views illustrated in the drawing figures.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

For purposes here, the words "comprising," "including," "having," and variants thereof, wherever they appear, shall be construed as open-ended terminology, with the same meaning as if the phrase "at least" were appended after each instance thereof.

The verb "may" is used to designate optionality/noncompulsoriness. In other words, something that "may" can, but need not.

Before elucidating the subject matter shown in the Figures, the present disclosure will be first described in general terms.

A holder is provided and is designed as a body defining two prongs joined with each other at proximal ends thereof. Each prong from two prongs has a distal end. The distal end may have a flat surface. The distal end may have a curved surface. The holder defines a hollow interior between the two prongs. The holder also defines an opening between distal ends of these two prongs. In other words, it will be understood that the body is designed as an open body with distal ends of the prongs, where the distal ends are disposed at a distance from each other and are not being connected to one another. The opening may be referred to as a peripheral opening or an opening in a periphery of the body. Thus, the opening being in an open communication with the hollow interior. The opening may be also referred to as a void in the body. During use of the holder, the opening facilitates insertion of an elongated object into the hollow interior and a removal of the elongated object from the hollow interior where such elongated object would be difficult to insert into and remove from the hollow interior if the opening was not provided. In a non-limiting example, the hollow interior is oriented during use of the holder to receive an elongated subject, for example such as shovel to be held in a vertical direction. Without the opening, the free handle end of the shovel must be first positioned above the hollow interior and then the handle has to be passed through the hollow interior in a downward direction until the shovel blade rests on the body. The opening allows the shovel to be inserted into the hollow interior in a motion being generally normal to the vertical direction.

The shape of the body may be designed with prongs that are disposed parallel to each other. The shape of the body may be designed with prongs that have straight portion terminating with distal ends. The body may be provided in a U-shape configuration in a plane that includes both distal ends. One or both prongs may have portions bent in a plane disposed at an angle to a plane of the remaining portion of the prongs. The angle may be anyone of acute, right, and obtuse angle. In an example, a portion of the prong that terminates at (includes) the distal end may be offset from a portion of the prong that include the proximal end. During use, the distal ends may be offset from the rest of the body in a vertical direction. The shape of the body may be designed with prongs that are disposed at an acute angle to each other, converging to a common proximal edge in a V-shaped configuration. The body may be provided as a U-shaped configuration. Thus, the prongs may define a bifurcated shape of the body. The shape of the body may be designed with prongs where the opening (distance) at distal ends is sized smaller than a distance between proximal ends. The shape of the body may be designed to have one or both prongs with a combination of curved and straight portions. The shape of the body may be designed to have one or both prongs being entirely curved. The body may have an entirely curved shape without any visible distinctions between the two prongs, except for the distal ends. A portion of the holder that joins or includes proximal ends of the prongs may be referred to as an inner portion of the body. The distal ends of the body may be also referred to as distal ends of the holder.

The body may be designed such that a size across a cross-sectional area of the body is smaller than a length of the body measured as a peripheral dimension between the distal ends (i.e., end-to-end). The body may be manufactured by a forming process from any one of an elongated wire, rod, a bar, a tube or any combination thereof. A press brake or a wire-forming equipment may be used for the purpose of forming the body. A metallic body may be manufactured by a casting process using a mold. A plastic body may be manufactured by a molding process using a mold. The body may be designed from a combination of metal and plastic.

The holder is also designed with a pivot on a distal end of one prong from the two prongs. The pivot may be designed as a protrusion on such one distal end. The protrusion may have a cross-sectional area being smaller than the cross-sectional area of the distal end. The protrusion may be provided integral with the body as a one-piece member. In an example, the protrusion may be machined from a material stock that the body is being manufactured from. The extrusion may be casted or molded with the body. Such protrusion may be threaded. In other words, such protrusion may have an external thread.

The pivot may be designed as a bore or a cavity within the body, and being accessible from the distance end, to receive a pin with a portion protruding from the surface of the distal end. Such bore or cavity may be also threaded, i.e. provided with an internal thread to receive a threaded fastener. The threaded fastener then defines the protrusion.

The pivot may be also designed as the bore or cavity with a protrusion being provided by a separate component that is partially received within such bore or cavity. Such separate component may be a pin received within the bore or cavity. A cross-sectional area of the pin may be sized to allow for a minimal clearance with a cross-sectional area of the bore or cavity to provide for a slip fit between the pin and the bore or cavity. The pin may be referred to as a rod. The pin may be referred to as a dowel. A cross-sectional area of the pin may be sized larger than the cross-sectional area of the bore or cavity to provide for a press fit between the pin and the bore or cavity.

The holder is also designed with a protrusion on a distal end of another prong from the two prongs. This protrusion may be also provided as an integral portion of the body, as described above or may be a separate member attached to the body as described above.

The holder may be designed with another pivot mediate two distal ends of the body. Such pivot may be positioned centrally in a respect to the opening between two distal ends and extend outwardly from an exterior surface of the body. Such pivot may be provided as a protrusion on the exterior surface of the body. A portion of the body with such another pivot may be referred to as the inner portion of the body. Such inner portion may be designed as a curved portion.

The holder, as described above, may be adapted with optional cushioning member to cushion contact between the prongs and object being held by the prongs. The cushioning member may be designed as two hollow sleeves, each sleeve being sized and shaped to receive a portion of the prong therewithin. The cushioning member may be designed as one or two strips of cushioning material that are attached to a surface of the prong(s) with an adhesive. During use, such strip(s) will be positioned on a surface of the holder to be in a contact with the object. The cushioning material may include any one of a foam, a rubber, a resilient engineered polymer and any combinations thereof.

A retainer for a holder with two prongs is also disclosed. The retainer may be designed as a rigid body with an elongated shape. The retainer may be provided as an elongated plate or as an elongated bar. The retainer includes a rigid material being one of a metal, a plastic and a combination thereof. The retainer is also designed with a pivot connection adjacent one end of the retainer and an edge notch adjacent an opposite end of the retainer. During use of the retainer, the pivot connection is at the above described pivot at the distal end of one prong from, two prongs. The pivot connection may be designed as an aperture through a thickness of the retainer. The pivot connection may be designed as a pin extending outwardly from a surface of the retainer. During use, the retainer pivots to selectively open and completely close an opening between the distal ends of the prongs. The edge notch is designed to stop an over-pivoting of the retainer where the retainer does not close the opening during a pivoting movement. During use, the edge notch is positioned to receive the protrusion on the distal end of another prong from two prongs.

The above described retainer does not need to be completely removed during operation of the holder. The holder may be also provided with a threaded lock, by way of the threaded projection passed through the aperture in the retainer and a threaded fastener threadably engaging the threaded projection, where the retainer cannot inadvertently "snap off". Yet, the retainer may be removed completely if not needed for a particular application. The retainer may be allowed to pivot downwardly during use and uncover the opening while being secured at the pivot connection. The above described retainer retains its shape and rigidity during a repetitive use of opening and closing the opening and thus will not distort, stretch or break due to such repetitive use.

The holder may be also designed with a body, as described above, and a retainer. The retainer may be designed with an elongated shape. The retainer may be provided as an elongated plate or as an elongated bar. The retainer includes a rigid material being one of metal, plastic and a combination thereof. This holder is designed with each of a pivot connection and a detachable connection between retainer and body. The retainer may be referred to as a latch.

The pivot connection includes an aperture through a thickness of the retainer adjacent one end thereof. The aperture may be sized and shaped to pass the above described protrusion therethrough. A threaded fastener, such as a nut, may be provided to threadably engage a portion of the protrusion that extends past a surface of the retainer. The aperture may be sized and shaped to pass a threaded fastener therethrough, where the fastener will threadably engage the threaded bore or cavity in the body. In other words, the holder may be designed to detachably retain the elongated retainer on the distal end of the one prong.

The detachable connection includes an edge notch through the thickness of the retainer adjacent an opposite end thereof. The edge notch may be sized and shaped to pass an extension on the distal end of another prong from the two prongs. During operation of the holder, the retainer pivots, at the pivot connection, in a plane which also includes surfaces of the distal ends of the two prongs so as to open and completely close the opening. When the retainer completely closes the opening, the edge notch is in contact with the extension on the distal end of another prong from the two prongs to prevent additional pivoting of the retainer to undesirably re-open the opening. This protrusion may be also threaded to receive a threaded fastener, such as a nut, to detachably retain the elongated retainer on the distal end of another prong. In other words, the nut may be tightened against the surface of the retainer to prevent accidental over-pivoting of the retainer to open the opening and may be loosen to allow the intended pivoting of the retainer. It will be understood that the extension on the distal end of another prong from the two prongs functions as a retainer stop. The retainer stop may be also provided by a fastener threadably engaging a threaded bore or a threaded cavity within the distal end of another prong. The retainer stop may be also provided by a pin engaging a bore or a cavity in the distal end of another prong.

The above described retainer does not need to be completely removed during operation of the holder. The holder may be also provided with a threaded lock, by way of the threaded pivot projection and a threaded fastener threadably engaging the threaded pivot projection, where the retainer cannot inadvertently "snap off". Yet, the retainer may be removed completely if not needed for a particular application.

The holder may be designed with a body, as described above and with a retainer, as described above, where each prong of the body is designed with a bent straight portion that terminates in the distal end. In this holder, the retainer also pivots in a plane being normal to a plane of the bent straight portions of the two prongs.

The holder may be designed with a body, as described above and with a pivot connection. This pivot connection may be designed as the protrusion on an exterior surface of the inner portion and a bracket with two legs disposed at a distance from each other, a middle portion joining proximal ends of each leg, and an aperture through a thickness of the middle portion, the aperture being sized and shaped to receive the protrusion therethrough. The protrusion may be threaded to threadably engage a threaded fastener, for example such as a nut. The pivot connection may be designed as a protrusion on the middle portion of the body and an aperture through the thickness of the body. In this holder, the body is designed to pivot about the bracket. This holder may be also adapted with the retainer as described above.

The holder may be designed with a body, as described above, with the pivot connection, as described above, and an arm. The arm may be solid throughout. The arm may be designed with a hollow interior, for example as a tubular member, to reduce overall weight of the holder. The arm may be designed as one of a straight arm, a curved arm and a combination thereof. The arm includes an aperture though a thickness of the arm at one end thereof. The bracket also includes aperture through a thickness of each leg at a distal end thereof. The distance between the legs is being sized to receive the one end of the arm where the aperture in the arm being aligned, during use of the holder, with the aperture in the thickness of each leg. A pivot may be then passed through aligned apertures to enable a rotation of the bracket about the arm. The pivot may be provided as a pair of threaded fasteners. One of the threaded fasteners may be provided as a wing nut to ease tightening of the nut on the threaded fastener stem to form a lock. The pivot may be provided as a pin passed through aligned apertures. In this holder the body is designed to pivot, with the bracket, about the one end of the arm. In other words, in this holder, the body is designed to pivot independently about the bracket and about the arm. This holder may be also adapted with the retainer as described above.

The holder may be designed with a body, as described above, with a pivot connection between the body and the bracket, as described above, with an arm, as described above, a pivot connection between the bracket and the arm, as described above, and with a mounting member connected to an opposite end of the arm. The end of the arm attached to the mounting member may be referred to as a proximal end and the end of the arm attached, either pivotally or non-pivotally, to the body may be referred to as a distal end. The mounting member may be referred to as a mount. The mounting member may be permanently connected to the arm, for example by a welding method, when the arm and the mounting member are manufactured from metal. The mounting member may be detachably connected to the arm. In this detachable attachment, the arm may be adapted with a flange that is fastened, with fasteners, to the mounting member. The arm positions the body at a distance to the mounting member. Length of the arm may depend on the size of the object to be supported by the body. Length of the arm may depend on a position of the object in a respect to the wall and, more particularly, an angle at which a surface of the object is to be oriented relative to a surface of the wall.

The mounting member may be designed with an offset at one edge thereof, the offset being sized and shaped to fit within a slot of a slatwall so that object received within the hollow interior is being suspended from the holder. Such offset will have an L-shaped configuration with one leg extending from the mounting member and another leg extending outwardly from the one leg. The offset may be referred to as an offset portion of the mounting member. The offset may be referred to as an offset portion of the holder. This mounting member is designed to hold the object on a slatwall.

The mounting member may be designed with two offsets at spaced apart edges of the mounting member. Each offset being sized and shaped to fit within a slot of a slatwall so that object received within the hollow interior is being suspended from the holder. This mounting member is designed to hold the object on a slatwall. The mounting member for attachment of the holder to the slatwall may be referred to as a mounting plate or a mounting bracket.

The mounting member may be designed with a hook, the hook being sized and shaped to fit into a hole in a peg board. This mounting member is designed to hold the object on a pegboard. The mounting member for attachment of the holder to the peg board may be also referred to as a mounting plate or a mounting bracket.

Each leg of bracket may be directly connected, at a distal end of the leg, to the mounting member without use of the arm. Each leg may be welded directly to the mounting member when both mounting member and bracket are manufactured from a metal material. The body in this holder design will pivot in a horizontal plane when the holder is attached to a vertical surface and/or a portion of a vertical structure.

The mounting member may be provided as one offset attached directly to the opposite end of the arm. The mounting member may be provided as two offsets attached directly, in a spaced apart relationship with each other, to the opposite end of the arm.

The mounting member may be provided as one offset attached directly to the distal end of one leg of the bracket, as described above. The mounting member may be provided as two offsets, each offset being attached directly to a respective leg of the bracket, as described above. Either the slatwall or the pegboard may be provided as a stationary structure. Thus, the holder may be designed with a pivot connection between the holder, mediate two distal ends thereof, and a stationary structure. The pivot connection may be the above described pivot connection between the body and the bracket. The pivot connection may be designed with a first pivot to pivot the holder in a horizontal plane and a second pivot connection to pivot the holder in a vertical plane independently from pivoting the holder in the horizontal plane. The first pivot may be the pivot connection between the body and the bracket, as described above. The second pivot may be the pivot connection between the bracket and the arm, as described above.

The mounting member may be provided with an aperture through a thickness of the mounting member so as to fasten the mounting member and, more particularly, the holder to a vertical surface. Such mounting member may be referred to as a base of the holder.

Either the slatwall or the pegboard may be provided as a portable structure, for example such as a rack. The holder may be designed with a pivot connection, as described above, between the holder, mediate two distal ends thereof, and a portable structure.

The mounting member may be provided as a hollow receptacle, shaped and sized to receive an elongated support therethrough. Such mounting member may be designed to attach the body with or without the retainer and with or without the pivot connection to a portable or a stationary stand. This mounting member may be provided with a clamp-like feature to adjustably secure the holder along a length of the stand. The mounting member may be also designed to attach to an upper end of the stand. The portable stand may be designed as a tri-pod.

Thus, the present disclosure discloses a stand, as described above and a holder, as described above, that is designed to attach to the stand.

When the holder is attached to a substrate being any one of the slatwall, the pegboard, the vertical surface or the stand, the portions of the prong adjacent the distal ends may be upturned to prevent if not completely eliminate inadvertent movement of the abject away from the substrate. The retainer, when used to close the opening between the distal ends of the prongs eliminates any possibility of the inadvertent movement of the object.

The present disclosure discloses a holder with a body, as described above, with a pivot connection between the body and the bracket, as described above, a mounting member, as described above, and a pivot connection between the bracket and the mounting member. The pivot connection between the bracket and the mounting member may be designed with a protrusion on a mounting member where the protrusion is received between the legs of the bracket and an aperture through a thickness of the protrusion. In other words, this holder is provided with a short arm sized enough to provide the pivot attachment.

In a combination with a slatwall, the present disclosure also discloses a holder, as described above, a mounting member, as described above, and a tension device. Such tension device may be designed with a threaded aperture through a thickness of the mounting member and a member threadably received within the threaded aperture and threadably movable in a direction normal to a surface of the mounting member so as to selectively increase or decreases a length of a portion protruding from a rear of the mounting member. The member may be a fastener with a knurled head. Since the dimension of the slot from a front surface of the slatwall to the rear vertical surface of the slot is larger than a thickness of the offset portion of the mounting member, little if any tension is exerted onto the mounting member during use and mounting member may easily move along a length of the slot. The tension device is designed to apply or exert tension onto the mounting member during use of the holder. When the above described screw is used, the screw stem is advanced so that the end or the stem contacts a front surface of the slatwall, pushing the mounting member away from the front surface of the slatwall and establishing a contact between the offset portion(s) and the front vertical surface of the slot. A resilient cap or a tip may be installed on the end of the stem to adjust the amount of tension exerted onto the mounting member.

A method of holding an object may be achieved by pivotally mounting a holder with two distal ends, a hollow interior and an opening between the two distal ends, the opening being in an open communication with the hollow interior. Then, inserting an object into the hollow interior through the opening. Next, pivoting a retainer to completely close the opening at the two distal ends. Finally, supporting the object with the holder.

When the holder is mounted to a vertical wall or a vertical surface, pivotally mounting the holder may be achieved by pivoting the holder in a horizontal plane with a first pivot, as described above. Pivotally mounting the holder may be achieved by pivoting the holder in a vertical plane with a second pivot, as described above, due to a weight of the object being supported by the holder. Pivotally mounting the holder may be achieved by pivoting the holder in vertical planed independently from pivoting the holder in a horizontal plane. Mounting of the holder may be achieved by inserting an offset portion of the holder into a slot of a slatwall. The offset portion may be provided within a mounting member of the holder. When it is desirable to prevent a linear movement of the holder in the slot, the holder and, more particularly, the mounting member of the holder may be adapted with a threaded aperture so as to advance a threaded fastener through the threaded aperture to contact a surface of the slatwall and push the mounting member away from the surface of the slatwall thus providing a contact between the offset portion and front surface of the slot.

A method of holding an object may be achieved by mounting a holder with two distal ends, a hollow interior and an opening between the two distal ends, the opening being in an open communication with the hollow interior. Then, inserting an object into the hollow interior through the opening. Next, pivoting the holder in a horizontal plane. Finally, supporting the object with the holder. The method may be also achieved by pivoting a retainer to completely close the opening at the two distal ends.

A method of holding an object may be achieved by mounting a holder with two distal ends, a hollow interior and an opening between the two distal ends, the opening being in an open communication with the hollow interior. Then, inserting an object into the hollow interior through the opening. Next, manually pivoting the holder in a horizontal plane, with a first pivot, as described above. Then, pivoting the holder in a vertical plane with a second pivot, as described above, due to a weight of the object being supported by the holder. Finally, supporting the object with the holder. The method may be also achieved by pivoting a retainer to completely close the opening at the two distal ends.

A method of holding an object on a vertical surface may be achieved by pivotally mounting a holder with two distal ends, a hollow interior and an opening between the two distal ends, the opening being in an open communication with the hollow interior. Next, advancing a threaded fastener to exert force onto the vertical surface. Then, inserting an object into the hollow interior through the opening. Finally, supporting the object with the holder. However, advancing the threaded fastener may occur after inserting an object into the hollow interior through the opening. The method may be also achieved by pivoting a retainer to completely close the opening at the two distal ends.

The holder, as described above, may be used to hold, in a suspended manner, a string musical instrument on a wall, where the string musical instrument is supported (suspended) by its neck (headstock). It would be understood that the holder, as described above, may be used to hang the musical instrument on a wall or on a stand. The wall may be provided as a slat wall. The wall may be provided as a slatwall portion with a single slot. The wall may be provided as a pegboard. In either wall configuration, holder will be provided with an arm to allow a pivoting, due to a manual force applied to the holder, of the string musical instrument at an angle to a surface of the wall at a first pivot. On string musical instrument with to a non-symmetrical geometry of the neck, the second pivot allows the holder to rotate, due to a weight of the string musical instrument received within the hollow interior through the opening and being held by the body in a vertical plane to auto-level due to such weight, where the string musical instrument hangs vertically straight. When the holder is used to hold string musical instrument, the holder, as described above, may be referred to as a string musical instrument holder. A guitar may be an example of such string musical instrument. Accordingly, the holder may be referred to as a guitar holder and even as a guitar hanger. It would be understood, that an overall length of the string musical instrument in general, and guitar in particular requires insertion and removal of such string musical instrument in a plane normal to a plane to the wall, rather than in a plane which is parallel to the plane of the wall. Hence, a need for the opening between distal end of the body.

The holder, as described above, may be used to support, in a hang manner, a garden implement on a wall.

The holder, as described above, may be used to support, in a hang manner, a tool on a wall.

Thus, in applications where the object is to be held (hung) on the vertical wall, the body of the holder is pivotally connectable to the mounting member so as to independently pivot about the mounting member in each of a horizontal plane, due to a manual force applied to the body, and a vertical plane, due to a weight of an object when received within the hollow interior through the opening and when being supported by the body.

It will be further understood that the object is received within the hollow interior of the body. Thus, the holder may be referred to as a receptacle.

A string instrument holder may be designed with a mounting member; an arm with a proximal end attached to the mounting member, the arm extending from the mounting member; a body with a hollow interior and an opening, the opening being in an open communication with the hollow interior, the body pivotally connectable to a distal end of the arm so as to independently pivot in each of a horizontal plane, due to a manual force applied to the body, and a vertical plane, due to a non-symmetrical geometry of a neck of a string instrument received within the hollow interior through the opening; and a retainer attachable to the body at the opening, the retainer designed to selectively close and open the opening.

A string instrument holder may be designed with a mounting member; an arm with a proximal end attached to the mounting member, the arm extending from the mounting member; a pivot at a distal end of the arm; a body comprising a hollow interior and an opening, the opening being in an open communication with the hollow interior, the body pivotally connectable to a distal end of the arm so as to independently pivot in each of a horizontal plane, due to a manual force applied to the body, and a vertical plane, due to a non-symmetrical geometry of a neck of a string instrument received within the hollow interior through the opening; and a retainer attachable to the body at the opening, the retainer designed to selectively close and open the opening.

A string instrument holder may be designed with a mounting member; an arm with a proximal end attached to the mounting member, the arm extending from the mounting member; a pivot at a distal end of the arm; a body comprising two straight portions disposed parallel to each other and joined therebetween with a curved portion, each straight portion having a distal end, the body defining a hollow interior and an opening between the distal ends, the opening being in an open communication with the hollow interior; the curved portion connected to the pivot so that the body is designed to independently pivot in each of a horizontal plane, due to a manual force applied to the body, and a vertical plane, due to a non-symmetrical geometry of a neck of a string instrument received within the hollow interior through the opening; and a retainer attachable to the body at the distal end of each straight portion, the retainer designed to selectively close and open the opening.

A string instrument holder may be designed with a mounting member with a threaded aperture through a thickness of the mounting member; an arm with a proximal end attached to the mounting member, the arm extending from the mounting member; a pivot at a distal end or the arm; a body comprising two straight portions disposed parallel to each other and joined therebetween with a curved portion, each straight portion having a distal end, the body defining a hollow interior and an opening between the distal ends, the opening being in an open communication with the hollow interior; the curved portion connected to the pivot so that the body is designed to independently pivot in each of a horizontal plane, due to a manual force applied to the body, and a vertical plane, due to a non-symmetrical geometry of a neck of a string instrument received within the hollow interior through the opening; a retainer attachable to the body at the distal end of each straight portion, the retainer designed to selectively close and open the opening; and a fastener with a threaded portion sized to engaged the threaded aperture.

A holder may be designed with a mount; a receptacle comprising a hollow interior and an opening, the opening being in an open communication with the hollow interior, the receptacle pivotally connectable to the mount so as to independently pivot in each of a horizontal plane, due to a manual force applied to the receptacle, and a vertical plane, due to a non-symmetrical geometry of a neck of a string instrument received within the hollow interior through the opening; and a retainer attached to the receptacle at the opening, the retainer designed to selectively close and open the opening.

A holder may be designed with a mounting member; an arm with a proximal end attached to the mounting member, the arm extending from the mounting member; a first curved prong pivotally attached to the pivot to pivot about the distal end in each of a horizontal plane and a vertical plane; and a second curved prong pivotally attached to the pivot to pivot in the each of the horizontal plane and the vertical plane; the first and second prongs defining a void therebetween.

A holder may be designed with a mounting member; an arm with a proximal end attached to the mounting member, the arm extending from the mounting member; a clevis pivotally attached to a distal end of the arm to pivot in a horizontal plane during operation of the holder; and a bifurcated member pivotally attached to the clevis to pivot in a vertical plane during the operation of the holder.

A holder may be designed with a mount; and a receptacle pivotally connectable to the mount so as to independently pivot in each of a horizontal plane and a vertical plane during the operation of the holder.

A holder may be designed with a mount; and a hanger pivotally connectable to the mount, to independently pivot in each of a horizontal plane and a vertical plane during the operation of the holder, the hanger having an opening.

A holder may be designed with a mount; a receptacle pivotally connectable to the mount so as to independently pivot in each of a horizontal plane and a vertical plane during the operation of the holder, the receptacle having an opening; and a latch attachable to the receptacle, the latch designed to selectively open and close the opening.

A holder may be designed with a mount; a hanger pivotally connectable to the mount, to independently pivot in each of a horizontal plane and a vertical plane during the operation of the holder, the hanger having an opening; and a latch attachable to the hanger, the latch designed to selectively open and close the opening.

A holder may be designed with a mount; a hanger pivotally connectable to the mount, to independently pivot in each of a horizontal plane and a vertical plane during the operation of the holder, the hanger having an opening; and a lock attachable to the hanger, the latch designed to selectively open and close the opening.

A holder may be designed with a mounting plate; a receptacle pivotally connectable to the mounting plate, to independently pivot in each of a horizontal plane and a vertical plane during the operation of the holder, the receptacle having an opening.

A holder may be designed with a base; a receptacle pivotally connectable to the base to independently pivot in each of a horizontal plane and a vertical plane during the operation of the holder, the receptacle having an opening.

A holder may be designed with a base; a hanger pivotally connectable to the base, to independently pivot in each of a horizontal plane and a vertical plane during the operation of the holder, the hanger having an opening.

A holder may be designed with a base; a receptacle pivotally connectable to the base so as to independently pivot in each of a horizontal plane and a vertical plane during the operation of the holder, the receptacle having an opening; and a lock attachable to the receptacle, the latch designed to selectively open and close the opening.

A holder may be designed with a mounting member; an arm with a proximal end attached to the mounting member, the arm extending from the mounting member; a pivot at a distal end of the arm; a first curved prong pivotally attached to the pivot to pivot about the distal end in each of a horizontal plane and a vertical plane; and a second curved prong pivotally attached to the pivot to pivot in the each of the horizontal plane and the vertical plane; the first and second prongs defining a void therebetween.

A holder may be designed with a stand; and a receptacle pivotally connectable to the stand so as to independently pivot in each of a horizontal plane and a vertical plane during the operation of the holder, the receptacle having an opening.

A holder may be designed with a stand; and a hanger pivotally connectable to the stand so as to independently pivot in each of a horizontal plane and a vertical plane during the operation of the holder, the hanger having an opening.

A lock for a holder with two prongs may be designed with a threaded member at a free end of each prong; and a bar pivotally attached to one prong and releaseably attached to another prong.

A lock for a holder with two prongs may be designed with an external thread on a free end of each prong; and a bar pivotally attached to one prong and releaseably attached to another prong.

A lock for a holder with two prongs may be designed with a threaded bore in a free end of each prong; and a bar pivotally attached, with a first fastener, to one prong and releaseably attached, with a second aperture, to another prong; the bar selectively connecting the free ends of the first and second prongs.

A guitar hanger may be designed with a base; an arm with a proximal end attached to the base, the arm extending from the base; a pivot at a distal end of the arm; a first curved prong pivotally attached to the pivot to pivot about the distal end in each of a horizontal plane and a vertical plane; and a second curved prong pivotally attached to the pivot to pivot in the each of the horizontal plane and the vertical plane; the first and second prongs defining a void therebetween.

A stand may be designed with a mount; and a hanger pivotally connectable to the mount so as to independently pivot in each of a horizontal plane and a vertical plane during the operation of the holder, the hanger having an opening.

A stand may be designed with a base; and a hanger pivotally connectable to the base so as to independently pivot in each of a horizontal plane and a vertical plane during the operation of the holder, the hanger having an opening.

A stand may be designed with a mount; and a receptacle pivotally connectable to the mount so as to independently pivot in each of a horizontal plane and a vertical plane during the operation of the holder, the receptacle having an opening.

A guitar hanger may be designed with a mount; and a hanger pivotally connectable to the hanger so as to independently pivot in each of a horizontal plane and a vertical plane during the operation of the holder, the hanger having an opening.

A guitar hanger may be designed with a stand; and a receptacle pivotally connectable to the stand, to independently pivot in each of a horizontal plane and a vertical plane during the operation of the holder, the receptacle having an opening.

A guitar hanger may be designed with a base; and a receptacle pivotally connectable to the base, to independently pivot in each of a horizontal plane and a vertical plane during the operation of the holder, the receptacle having an opening.

A slatwall guitar hanger may be designed with a mount; and a receptacle pivotally connectable to the mount, to independently pivot in each of a horizontal plane and a vertical plane during the operation of the holder, the receptacle having an opening.

A guitar hanger may be designed with a slatwall mount; and a receptacle pivotally connectable to the mount, to independently pivot in each of a horizontal plane and a vertical plane during the operation of the holder, the receptacle having an opening.

A guitar hanger may be designed with a mount; a receptacle pivotally connectable to the mount so as to independently pivot in each of a horizontal plane and a vertical plane during the operation of the holder, the receptacle having an opening; and a lock attachable to the receptacle, the latch designed to selectively open and close the opening.

A guitar hanger may be designed with a base; an arm with a proximal end attached to the base, the arm extending from the base; a pivot at a distal end of the arm; a first curved prong pivotally attached to the pivot to pivot about the distal end in each of a horizontal plane and a vertical plane; and a second curved prong pivotally attached to the pivot, to pivot in the each of the horizontal plane and the vertical plane; the first and second prongs defining a void therebetween.

A guitar hanger may be designed with a mount; an arm with a proximal end attached to the mount, the arm extending from the base; a pivot at a distal end of the arm; a first curved prong pivotally attached to the pivot to pivot about the distal end in each of a horizontal plane and a vertical plane; and a second curved prong pivotally attached to the pivot to independently pivot in the each of the horizontal plane and the vertical plane; the first and second prongs defining a void therebetween.

A guitar hanger may be designed with a mounting member; an arm with a proximal end attached to the mounting member, the arm extending from the mounting member; a clevis pivotally attached to a distal end of the arm to pivot in a horizontal plane during operation of the holder; and a bifurcated member pivotally attached to the clevis to pivot in a vertical plane during the operation of the holder.

A guitar hanger may be designed with a mounting plate; a receptacle pivotally connectable to the mounting plate, to independently pivot in each of a horizontal plane and a vertical plane during the operation of the guitar hanger, the receptacle having an opening.

A guitar hanger may be designed with a mount; an arm with a proximal end attached to the mounting member, the arm extending from the mounting member; a clevis pivotally attached to a distal end of the arm to pivot in a horizontal plane during operation of the holder; and a bifurcated member pivotally attached to the clevis to pivot in a vertical plane during the operation of the holder.

A guitar hanger may be designed with a stand; and a receptacle pivotally connectable to the stand so as to independently pivot in each of a horizontal plane and a vertical plane during the operation of the guitar hanger, the receptacle having an opening.

A string instrument holder may be designed with a mount; a receptacle pivotally connectable to the mount, to independently pivot in each of a horizontal plane and a vertical plane during the operation of the holder, the receptacle having an opening; and a lock attachable to the receptacle, the latch designed to selectively open and close the opening.

A hanger for a string instrument may be designed with a mount; a receptacle pivotally connectable to the mount, to independently pivot in each of a horizontal plane and a vertical plane during the operation of the holder, the receptacle having an opening; and a lock attachable to the receptacle, the latch designed to selectively open and close the opening.

A hanger for a string instrument, the hanger comprising: a mount; and a receptacle pivotally connectable to the mount, to independently pivot in each of a horizontal plane and a vertical plane during the operation of the holder, the receptacle having an opening.

A guitar hanger may be designed with a mount; and a receptacle comprising a hollow interior and a opening, the opening being in an open communication with the hollow interior, the receptacle pivotally connectable to the mount so as to independently pivot in each of a horizontal plane, due to a manual force applied to the receptacle, and a vertical plane, due to a non-symmetrical geometry of a guitar neck received within the hollow interior through the opening; and a retainer attached to the receptacle at the opening, the retainer designed to selectively close and open the opening.

Now in a reference to the drawings.

FIG. 1 illustrates a perspective view of a holder 10. A body 12 has two prongs 14 that define the hollow interior 16. Prongs 14 are disposed at a distance 18 from each other, at least at distal ends 20 thereof. The distance 18 defines an opening into the hollow interior 16. When the prongs 14 are parallel to each other the distance 18 continues into the hollow interior 16. Prong portions 24 of the prong 14 that contain the distal end 20 may be bent or curved at 26 in a respect to the remaining portion of the body 12. The proximal ends 22 of prongs 14 may define a common proximal end of the body 12. Or proximal ends 22 may be spaced from each other to define an inner portion of the body 12. The prong portions 24 are illustrated as straight portions in various figures but may be provided as curved portions or a combination of curved and straight segments. A threaded protrusion 30 extends outwardly from one distal end 20. A threaded protrusion 32 extends outwardly from the other distal end 20.

Figure 2:
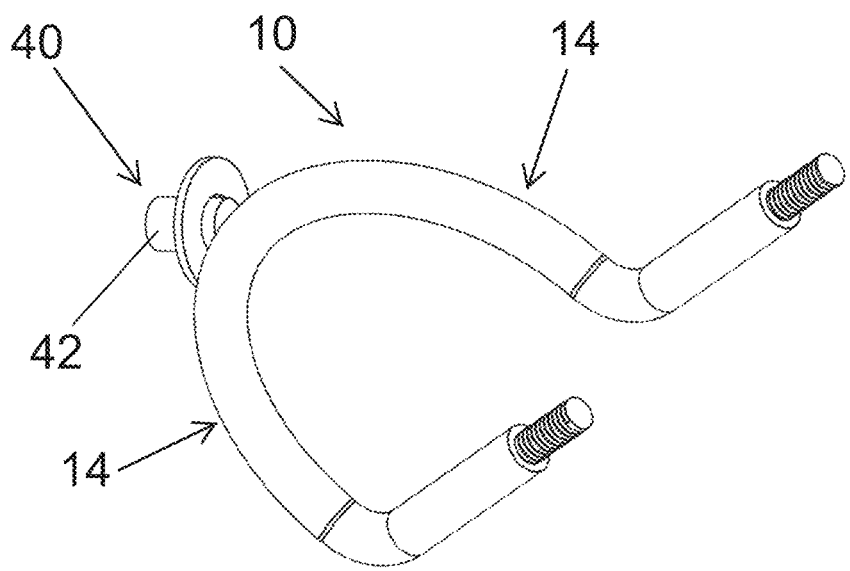
FIG. 2 illustrates a perspective view of a holder with a pivot.

FIG. 2 illustrates a perspective view of the holder 10 of FIG. 1 and further illustrates a pivot 40 as a protrusion 42 on an exterior surface of the body 12 at a common proximal end 22. The stem 42 may be adapted with an external thread, as is illustrated or can be adapted with an internal thread when the stem 42 is designed with a hollow interior.

FIG. 3 illustrates a perspective view of the holder of FIGS. 1-2 and further illustrates a retainer 50 being detached from the body 12 for the sake of clarity. As described above, the retainer 50 includes a retainer body 52 with an elongated shape, as aperture 54 and an edge notch 56. In operation or use of the holder 10, the retainer body 52 pivots at a pivot connection between the protrusion 30 and the aperture 54 and over pivoting of the retainer body 52 is prevented at the detachable connection of the protrusion 32 received within the edge notch 56. FIG. 3 also illustrates threaded fasteners 58 that threadably engages portions or the protrusions 30 and 32 that extend past an exterior surface 57 of the retainer body 52. To allow pivoting of the retainer body 52, the fasteners 58 may be stopped short of contacting the exterior surface 57 of the retainer body 52. Yet, the fasteners 58 can be manually tightened to apply force onto the body 52 against the distal ends 20. FIG. 3 also illustrates a cushioning sleeve 13 on the prong 14.

FIG. 4 illustrates a perspective view of the holder 10 with the retainer 50 being attached to the body 12 in a position to completely close the opening 18.

Figure 5:
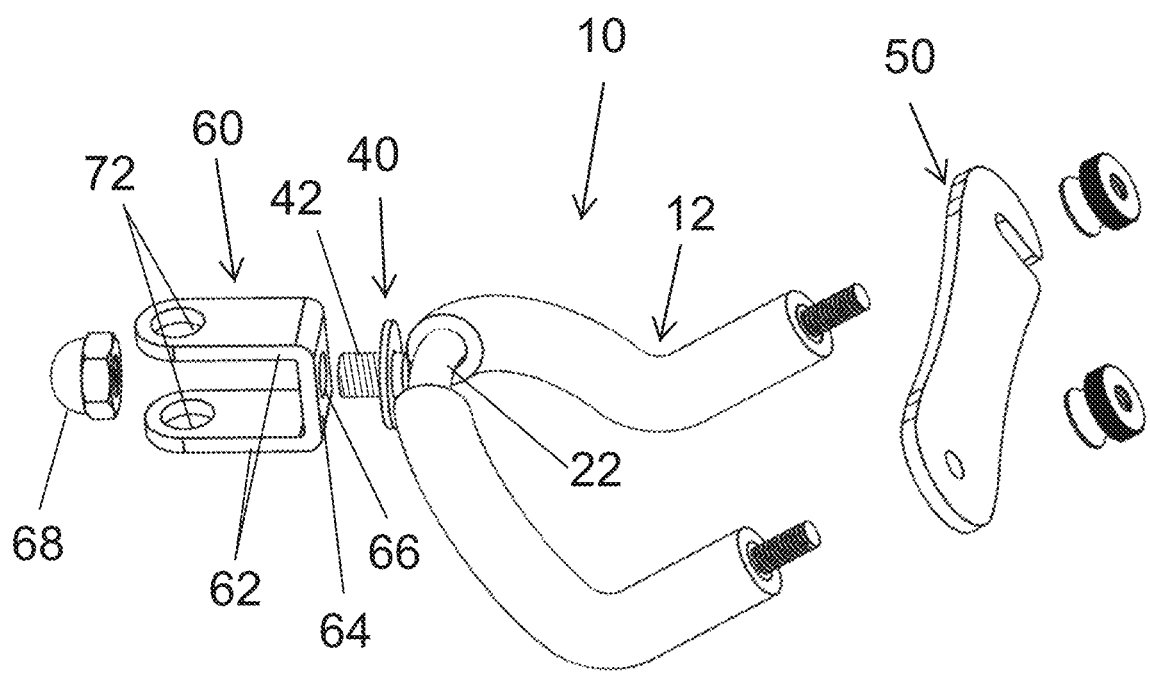
FIG. 5 illustrates an exploded perspective view of a holder with a retainer and a pivot.

FIG. 5 illustrates an exploded perspective view of the holder 10 with the retainer 50 and also illustrates a pivotal connection 60 at the pivot 40. A bracket has legs 62 and a middle portion 64. A through aperture 66 in the middle portion 64 is sized to receive the threaded protrusion 42 therethrough. A fastener 68 is employed to threadably engage the exterior thread of the protrusion 42 and cage the middle portion 64 and allow the body 12 to pivot about the bracket. When the protrusion 42 is designed with a hollow interior and an internal thread within such hollow interior, fastener 68 will be provided as a screw or bolt type rather than illustrated nut. FIG. 5 also illustrates an aperture 72 in each leg 62.

Figure 6:
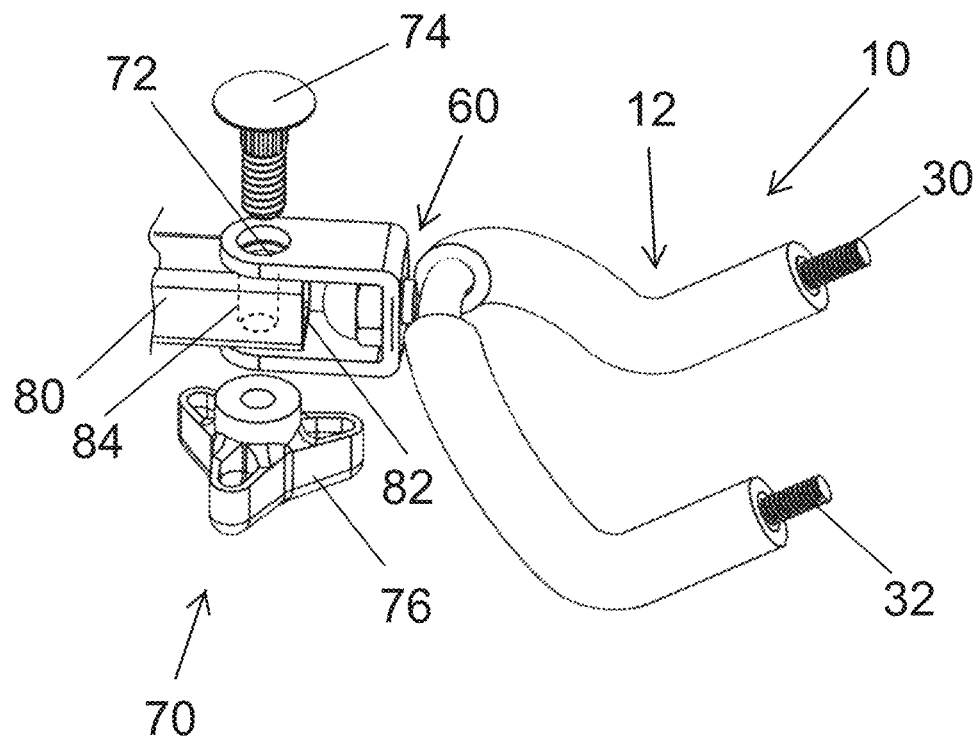
FIG. 6 illustrates an exploded perspective view of a holder with a pivot.

FIG. 6 illustrates an exploded perspective view of the holder 10 with the pivot connection 60 and a pivot connection 70. The pivot connection 70 is illustrated between the legs 62 of the bracket and an end 82 of the arm 80, particularly illustrated. An aperture 84 is provided adjacent the end. 82 and is aligned, during use of the holder 10, with apertures 72. Fasteners 74 and 76 can be then used to allow pivot of the bracket about the end 82. Protrusions 30 and 32 may be omitted in the holder 10 of FIG. 6. The pivot connections 60 and 70 in FIG. 6 may be referred to as a first pivot connections 60 and a second pivot connection 70. The pivot connections 60 and 70 in FIG. 6 may be also referred to as a combination pivot connection that is designed to independently pivot the body 12 in two different planes, as described above.

Figure 7:
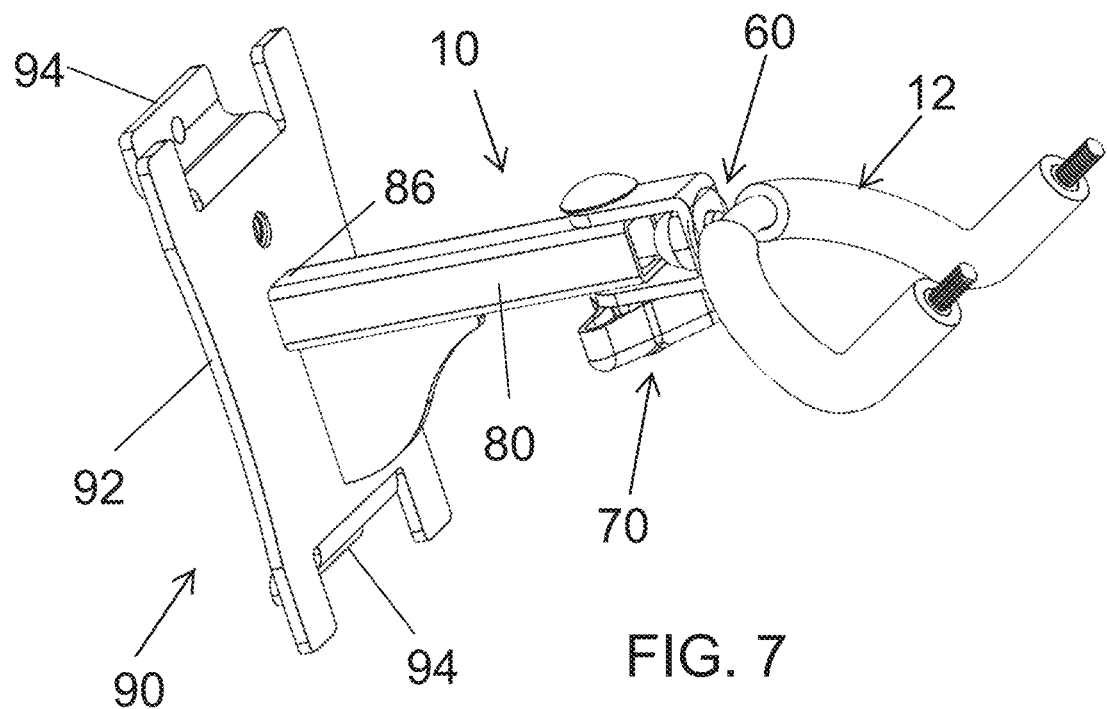
FIG. 7 illustrates a perspective view of a holder with a slatwall mounting member and a combination pivot.

FIG. 7 illustrates a perspective view of the holder 20 with the pivot connections 60 and 70, the arm 80 and a slatwall mounting, member 90. The slatwall mounting member 90 is illustrated as a plate shaped member 92 with two offset portions 94, although one offset portion 94 may be also provided. As it will be explained further in this document, each offset portion 94 engages a slot of the slatwall.

Figure 8:
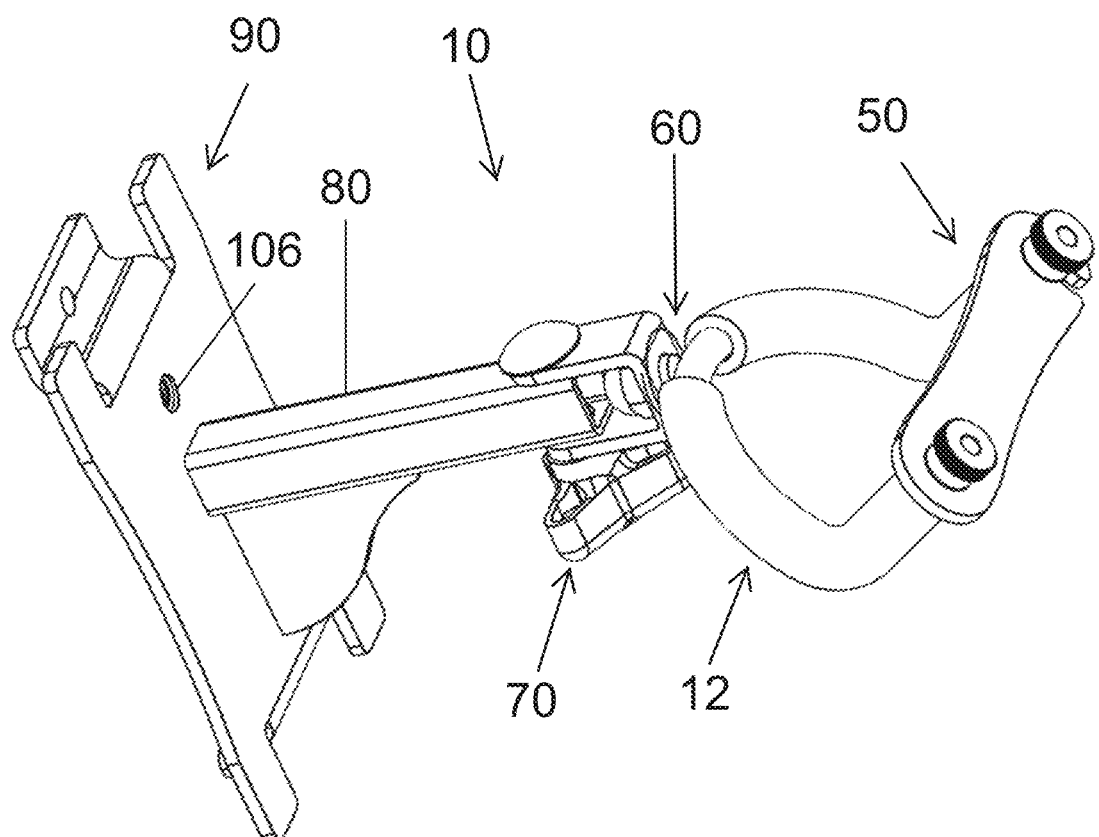
FIG. 8 illustrates a perspective view of a holder with a slatwall mounting member, retainer and a combination pivot.

FIG. 8 illustrates a perspective view of the holder 10 of FIG. 7 with the retainer 50 being positioned to close the opening 18.

Figure 9:
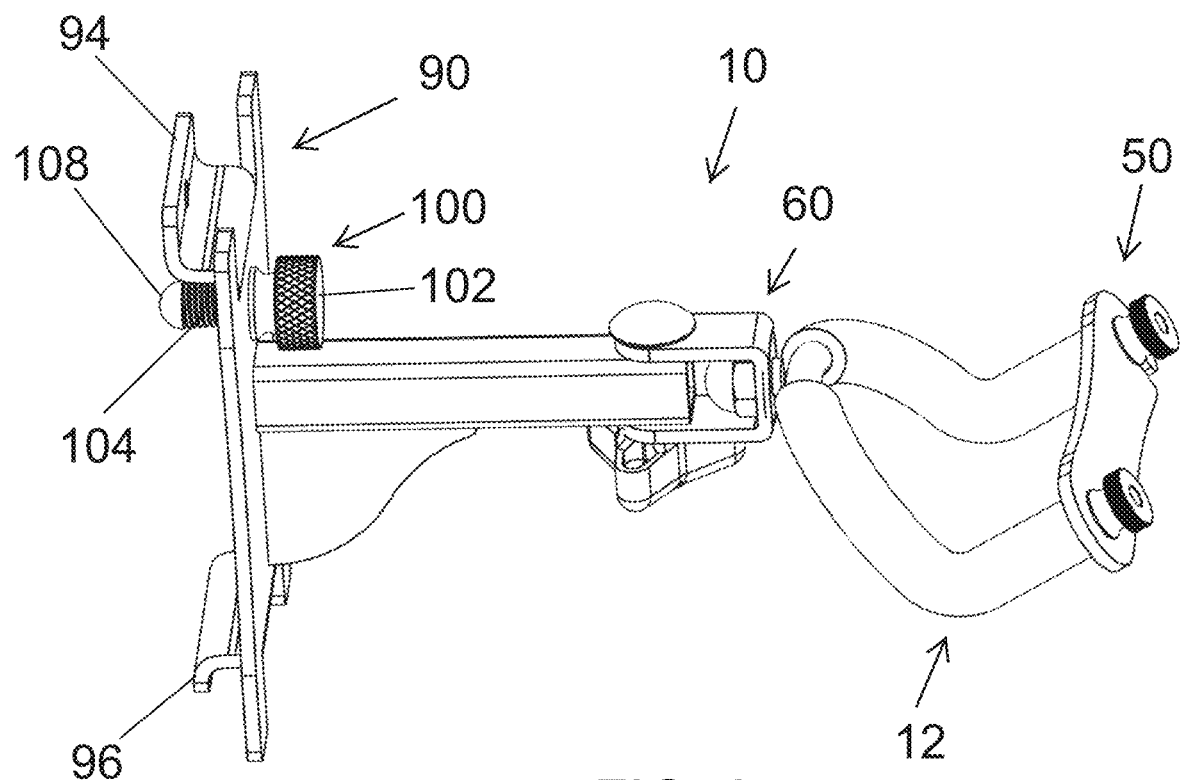
FIG. 9 illustrates a perspective view of a holder with a slatwall mounting member, a retainer, a combination pivot and a tension device.

FIG. 9 illustrates a perspective view of the holder 10 with the slatwall mounting member 90, the retainer 50, a combination of pivot connections 60 and 70 and a tension device 100. The tension device 100 is illustrated as a fastener 102 with a threaded stem 104 passed through a threaded aperture 106, best illustrated in FIGS. 7-8, within the slatwall mounting member 90. A resilient cap or tip 108 may be attached to a distal end of the stem 104.

Figure 10:
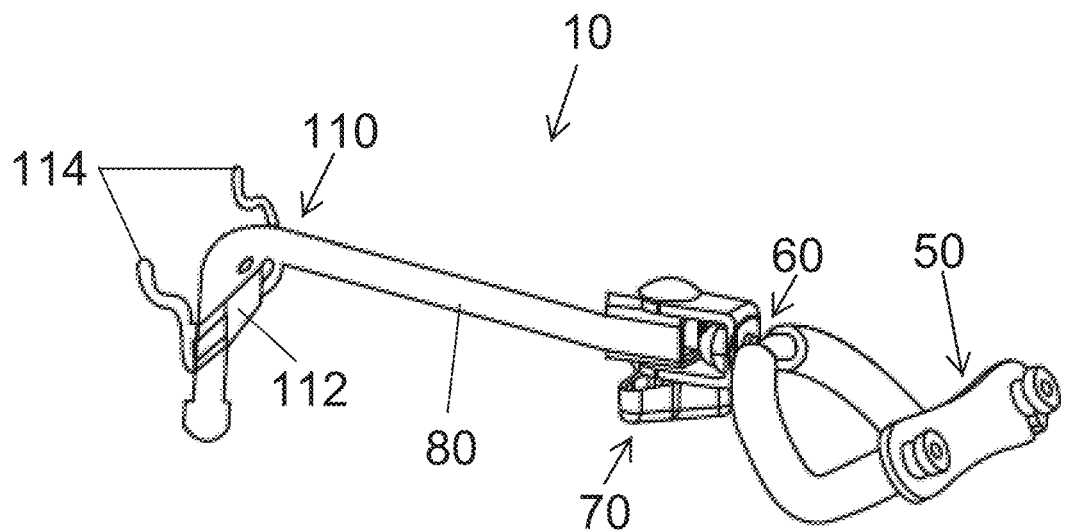
FIG. 10 illustrates a perspective view of a holder with a retainer, a combination pivot and a pegboard mounting member.

FIG. 10 illustrates a perspective view of the holder 10 with a pegboard mounting member 110. The pegboard mounting member 110 is illustrated as a bracket 112 attached to the arm 80 and that includes two hooks 114 to engage apertures of the pegboard (not shown).

Figure 11:
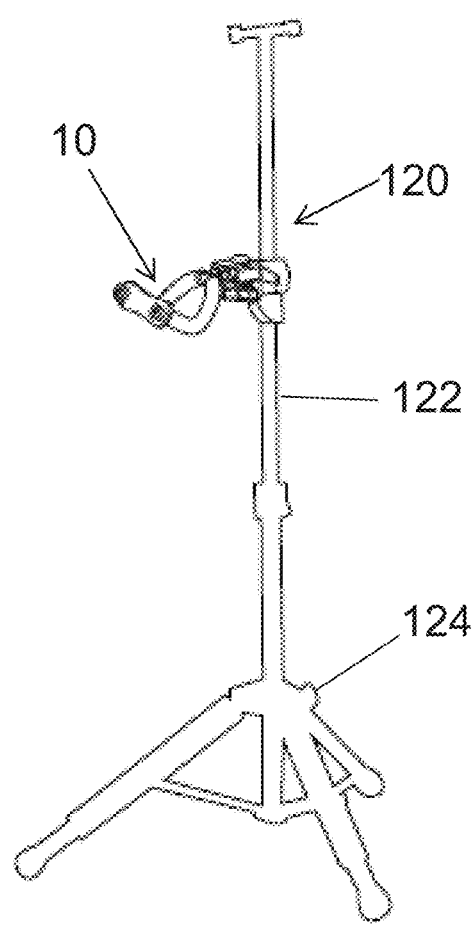
FIG. 11 illustrates a perspective view of a stand with a holder.
Figure 12:
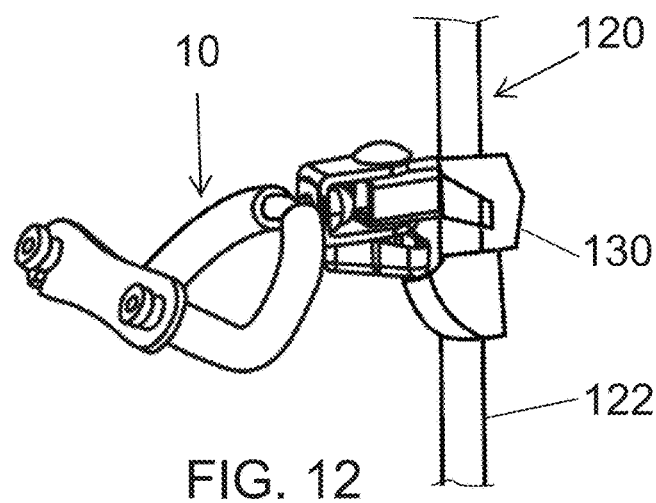
FIG. 12 illustrates a partial perspective enlarged view of the holder of FIG. 11.

FIGS. 11-12 illustrate a perspective view of the holder 10 attachable to an elongated portion 122 of a stand 120, where the elongated portion extends from the tripod 124. The mounting member 130 is designed to allow adjustment of a position of the holder 10 along a length of the elongated portion 122.

Figure 13:
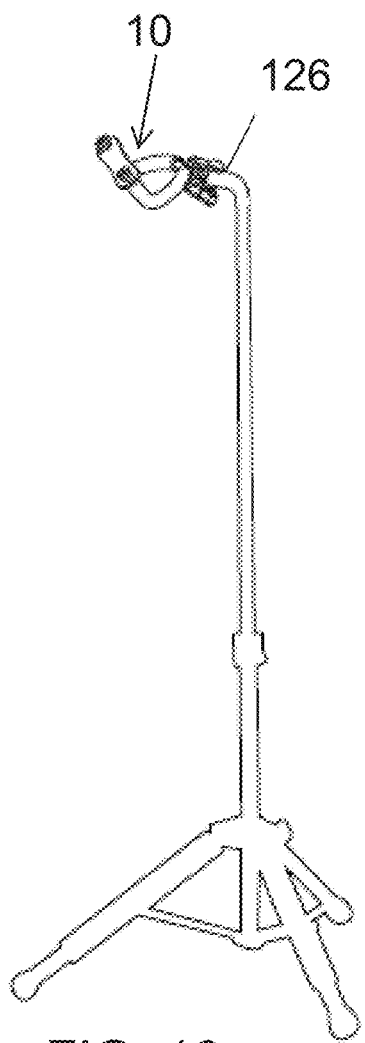
FIG. 13 illustrates a perspective view of a stand with a holder.
Figure 14:
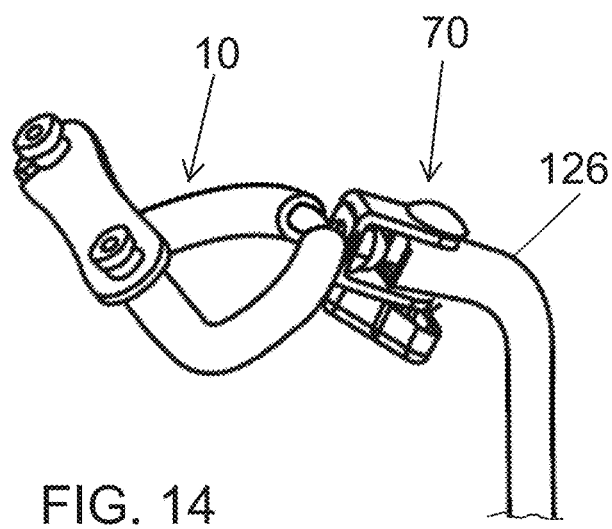
FIG. 14 illustrates a partial perspective enlarged view of the holder of FIG. 13.

FIGS. 13-14 illustrate a perspective view of the stand 120 with the holder 1o that is attached to an upper end 126 of the stand 120. Such upper end may be designed with the above described aperture 84.

Figure 15:
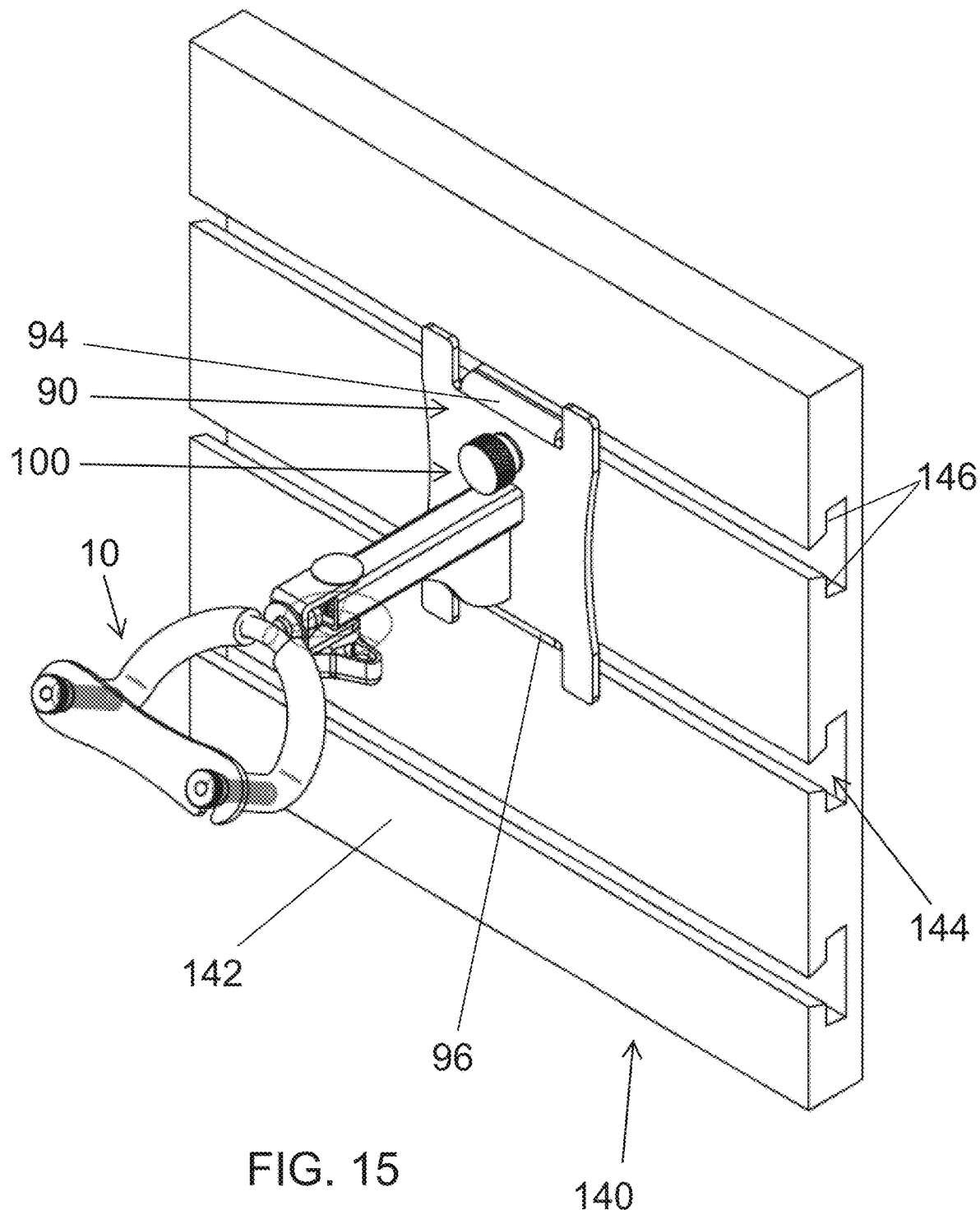
FIG. 15 illustrates a perspective view of a slatwall with a holder.

FIG. 15 illustrates a perspective view of a slatwall 140 with a holder 10. The offsets 94 and 96 of the slatwall mounting member 90 are inserted into slots 144 having front surfaces 146. Offset 96 may have a shorter vertical leg than the offset 94.

FIGS. 16-18 illustrates partial elevation views of the slatwall 140 with the holder 10 of FIG. 15, particularly illustrating engagement of the offset portions 94, 96 with the front surfaces 146 of the slot 144.

Figure 19:
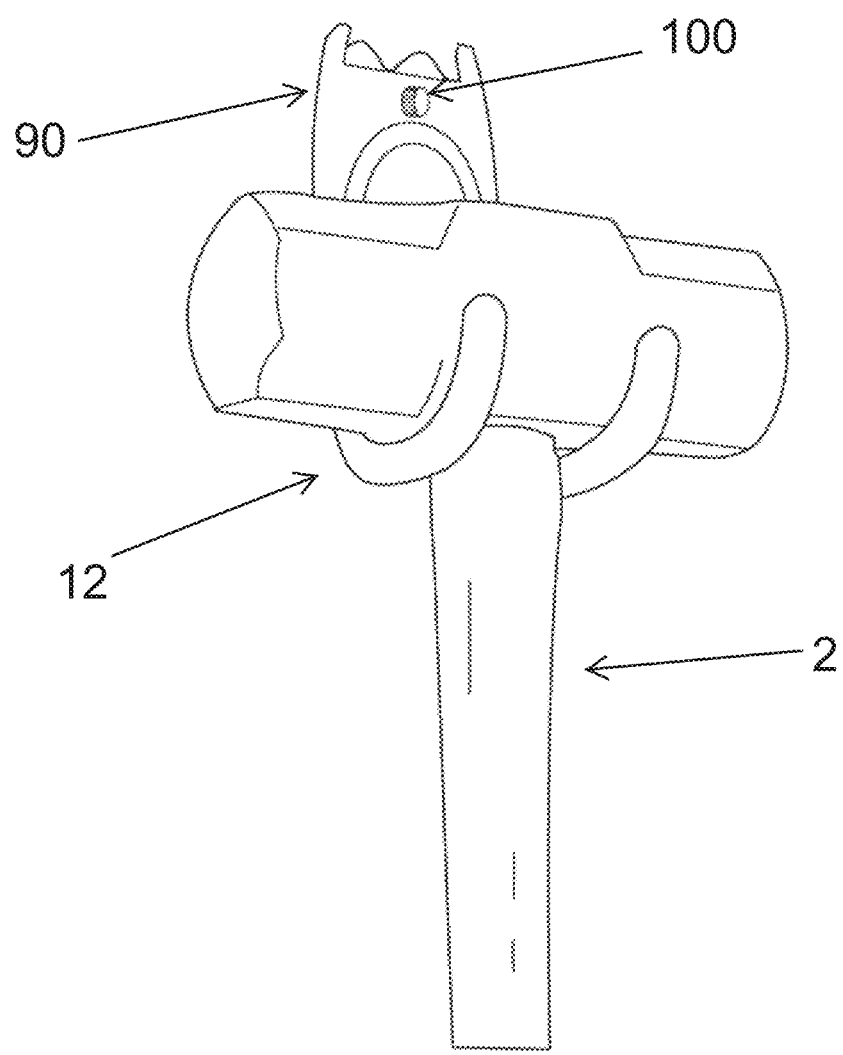
FIG. 19 illustrates a perspective view of a holder holding a hand tool.

FIG. 19 illustrates a perspective view oil the holder holding a hand tool 2. In other words, the tension device 100 may be used to improve slatwall holders presently in use.

Figure 20:
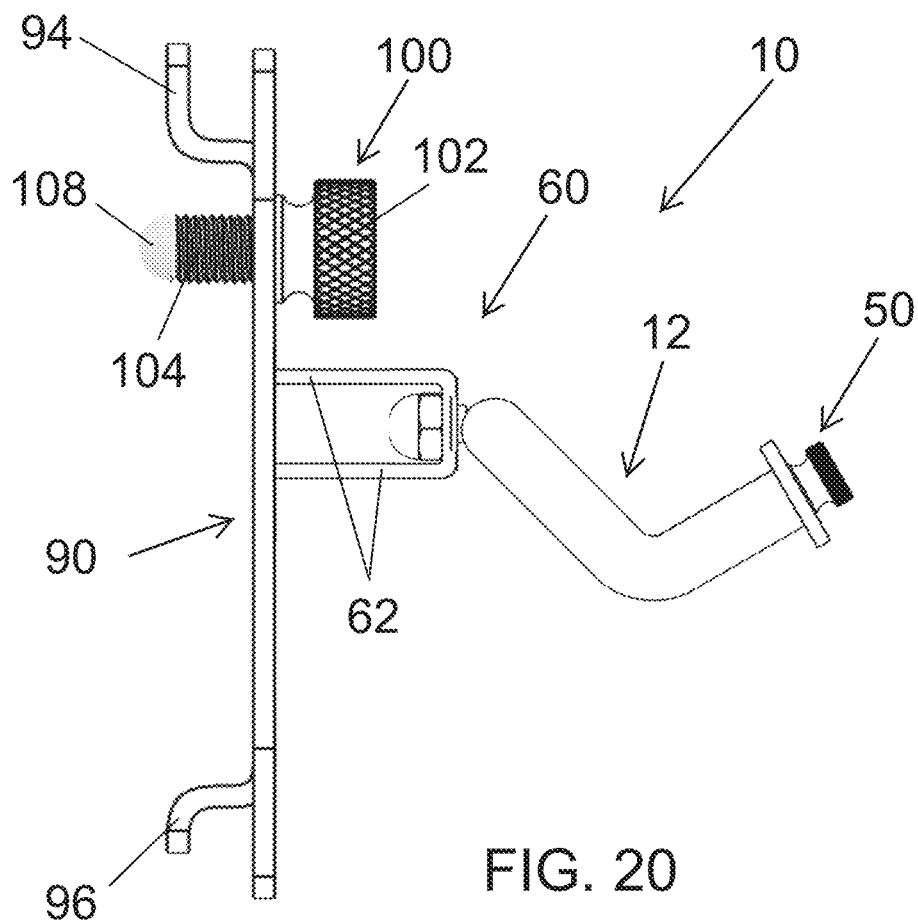
FIG. 20 illustrates an elevation view of a holder.

FIG. 20 illustrates an elevation view of a holder 10 where the legs 62 are connected directly to the mounting member 90 with offsets 94 and 96. Although, only one offset 94 may be used. Optional resilient cap or tip 108 is also illustrated.

Figure 21:
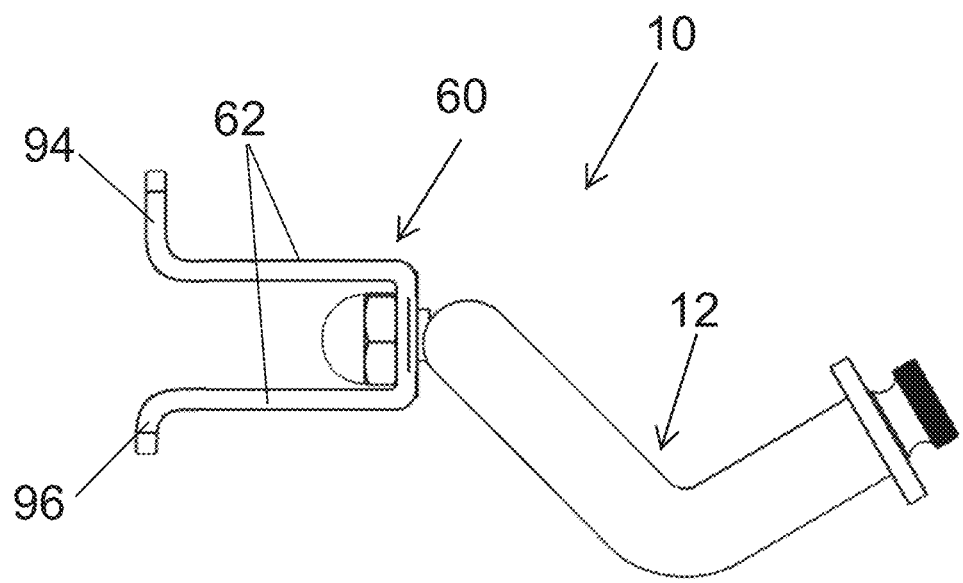
FIG. 21 illustrates an elevation view of a holder.

FIG. 21 illustrates an elevation view of a holder 10 where the offsets 94 and 96 are connected directly to respective legs 62 of the bracket 60. Although, only one offset 94 may be used.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded and rounded angles may be sharp. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

The Abstract is not intended to be limiting as to the scope of the claimed subject matter and is for the purpose of quickly determining the nature of the claimed subject matter.

What is claimed is:

1. A holder, comprising:
two prongs, each prong from the two prongs having a proximal end, a distal end and a bend between the proximal and distal ends, the distal end defining a bent portion of the each prong;
a curved portion joining proximal ends of the each prong, the two prongs and the curved portion defining each of a hollow interior and an opening between the distal ends;
a retainer comprising a rigid material, an aperture through a thickness of the retainer adjacent one end thereof, and an edge notch through the thickness of the retainer adjacent an opposite end thereof;
a pivot connection between the one end of the retainer, through the aperture, and a distal end of one prong where the retainer pivots, during use of the holder, in a plane being normal to a plane of the bent portions so as to open and completely close the opening;
a detachable connection between the edge notch adjacent the another end of the retainer and a distal end of another prong;
a mounting member;
an arm comprising a proximal end attached to the mounting member and an aperture through a thickness of the arm at a distal end thereof, the arm extending from the mounting member;
a bracket comprising two legs disposed at a distance from each other, the distance being sized to receive the distal end of the arm between the two legs, a middle portion joining proximal ends of each leg, and an aperture through a thickness of the each leg at a distal end thereof;
a pivot connection, during the use of the holder, between the bracket and the arm when the distal end of the arm is received between the two legs of the bracket, when the aperture at the distal end of each leg is aligned with the aperture through the thickness of the arm, and when a pivot is passed through aligned apertures, where the bracket being pivotable, during use of the holder, in a horizontal plane about the distal end of the arm; and
a pivot connection between the curved portion and the bracket, where the holder being pivotable, during the use of the holder, in a vertical plane about the distal end of the arm, independently from being pivotable in the horizontal plane.

2. The holder of claim 1, wherein the pivot connection between the curved portion and the bracket comprises:
a threaded protrusion on an exterior surface of the curved portion;
an aperture through a thickness of the middle portion of the bracket; and
a fastener threadably engaging the threaded protrusion passed through the aperture through the thickness of the middle portion.

3. The holder of claim 1, wherein the mounting member comprises two offset portions disposed at a distance from each other in a vertical direction during the use of the holder.

4. A holder, comprising:
a body defining two prongs joined with each other at proximal ends thereof, each prong from two prongs having a distal end, each prong including at least a bend between the proximal and distal ends, the distal end defining a bent portion of the each prong;
a hollow interior defined by the two prongs;
an opening between distal ends, the opening being in an open communication with the hollow interior;
an elongated retainer made from a rigid material, the elongated retainer including an aperture through a thickness of the elongated retainer adjacent one end thereof, and an edge notch through the thickness of the elongated retainer adjacent an opposite end thereof;
a pivot connection between the one end of the elongated retainer, through the aperture, and the distal end of the one prong of the holder, the pivot connection including a threaded protrusion on the distal end of the one prong, the threaded protrusion being passed through the aperture and is sized to receive a threaded fastener to detachably retain the elongated retainer on the distal end of the one prong; and
a detachable connection between an edge notch in another end of the retainer and the distal end of the another prong;
the elongated retainer pivotable in a plane being normal to a plane of the bent portions of the two prongs so as to open and completely close the opening.

5. The holder of claim 4, further comprising another pivot connection mediate two distal ends.

6. The holder of claim 5, wherein the another pivot connection comprises:
a protrusion on an exterior surface of an inner portion of the body; and
a bracket comprising two legs disposed at a distance from each other, a middle portion joining proximal ends of each leg, and an aperture through a thickness of the middle portion, the aperture being sized and shaped to receive the protrusion therethrough.

7. The holder of claim 6, wherein the another pivot connection further comprises:
an aperture through a thickness of each leg at a distal end thereof; and
an arm with another aperture though a thickness of the arm at one end thereof;
the distance being sized to receive the one end where the another aperture being aligned, during use of the holder, with the aperture in the thickness of each leg, and where the holder pivots, with the bracket, about the one end of the arm, in a horizontal direction.

8. The holder of claim 7, further comprising a mounting member being connected to an opposite end of the arm.

9. The holder of claim 8, wherein the mounting member comprises an offset at one edge thereof, the offset being sized and shaped to fit within a slot of a slatwall so that object received within the hollow interior is being suspended from the holder.

10. The holder of claim 4, further comprising a pivot connection between the holder, mediate two distal ends thereof, and a stationary structure.

11. The holder of claim 10, wherein the pivot connection comprises:
a first pivot designed to pivot the holder in a horizontal plane; and
a second pivot designed to pivot the holder in a vertical plane independently from pivoting the holder in the horizontal plane.

12. A hanger, comprising:
a slatwall mounting member at least including one offset and a threaded aperture through a thickness of the slatwall mounting member;
an arm at least including a proximal end attached to the slatwall mounting member and an aperture through a thickness of the arm at a distal end thereof, the arm extending from the slatwall mounting member;

a bracket with two legs disposed at a distance from each other to receive the distal end of the arm therebetween;

a pivot connection between the bracket and the distal end of the arm;

a holder with two prongs disposed at a distance from each other to define a hollow interior and an open end of the holder;

a pivot connection between the holder and the bracket; and a tension device with a thread designed to engage the threaded aperture.

13. The holder of claim 12, further comprising:

a retainer comprising an elongated shape, a rigid material, an aperture through a thickness of the retainer adjacent one end thereof, and an edge notch through the thickness of the retainer adjacent an opposite end thereof;

a pivot connection, during use of the holder, between the one end of the retainer, through the aperture, and a protrusion on a distal end of one prong of the holder, where the retainer pivots, during use of the holder, in a plane being normal to a plane of the two prongs so as to open and completely close the open end; and a detachable connection between an edge notch in another end of the retainer and a protrusion on a distal end of another prong.

14. The holder of claim 12, wherein each prong from the two prongs comprises a bend between proximal and distal ends, the distal end defining a bent portion of each prong from the two prongs, the holder further comprising:

an elongated retainer comprising a rigid material, an aperture through a thickness of the elongated retainer adjacent one end thereof, and an edge notch through the thickness of the elongated retainer adjacent an opposite end thereof;

a pivot connection, during use of the holder, between the one end of the elongated retainer, through the aperture, and a distal end of one prong of the holder, where the elongated retainer pivots, during use of the holder, in a plane being normal to a plane of the bent portions of the two prongs so as to open and completely close the open end; and a detachable connection between an edge notch in another end of the elongated retainer and a distal end of another prong.

15. The holder of claim 14, wherein the pivot connection comprises a threaded protrusion, the threaded protrusion being passed through the aperture and is sized to receive a threaded fastener to detachably retain the elongated retainer on the distal end of the one prong.

16. The holder of claim 14, wherein the detachable connection comprises a threaded protrusion on the distal end of the another prong, the threaded protrusion being passed through the edge notch and is sized to receive a threaded fastener to detachably retain the elongated retainer on the distal end of the another prong.

17. A method, comprising:

pivotally mounting a holder with two distal ends, a hollow interior and an opening between the two distal ends, the opening being in an open communication with the hollow interior, by inserting an offset portion of the holder into a slot of a slatwall;

preventing a linear movement of the holder in the slot by advancing a threaded fastener through a threaded aperture through a thickness of the holder to contact a vertical surface of the slatwall;

inserting an object into the hollow interior through the opening;

pivoting a retainer to completely close the opening at the two distal ends; and supporting the object with the holder.

18. The method of claim 17, further comprising pivoting the holder in a horizontal plane.

19. The method of claim 17, further comprising pivoting the holder in a vertical direction due to a weight of the object being supported by the holder.

20. A holder, comprising:

a body with two prongs, each prong from the two prongs having a distal end;

a hollow interior defined by the two prongs;

an opening between distal ends, the opening being in an open communication with the hollow interior;

a first protrusion on a distal end of one prong from the two prongs;

a second protrusion on a distal end of another prong from the two prongs; and a pivot connection mediate the distal ends, the pivot connection at least including:

a third protrusion on an exterior surface of the body, the third protrusion having a thread, a bracket including at least two legs disposed at a distance from each other, a middle portion joining proximal end of each leg, and an aperture through a thickness of the middle portion, the aperture being sized and shaped to receive the third protrusion therethrough, and a fastener having a second thread.

21. The holder of claim 20, wherein the bracket further includes two flanges, each flange from the two flanges extending outwardly from a respective leg.

22. The holder of claim 20, further comprising:

a first aperture through a thickness of one leg from the two legs; and a second aperture through a thickness of another leg from the two legs, the second aperture aligned with the first aperture.

23. The holder of claim 22, further comprising:

a stand with an end, the end sized to be received between the two legs, the end designed with a third aperture; and a pivotal connection between the end and the bracket.

24. The holder of claim 23, wherein the pivotal connection comprises a first fastener designed to pass through first, second and third apertures and a second fastener engaging a portion of the first fastener external to one leg.

25. The holder of claim 22, further comprising:

a mounting member designed to adjust a position of the holder along a length of an elongated portion of a stand; and fasteners to fasten the bracket to the mounting member.

26. The holder of claim 20, further comprising:

a pegboard mounting member with two hooks at one end; and a pivot connection between an opposite end of the pegboard mounting member and the bracket.

27. The holder of claim 20, further comprising:

a mounting member, the mounting member at least including two offset flanges and an aperture through a thickness of the mounting member mediate the two offset flanges;

an arm having a proximal end connected to the mounting member the arm extending outwardly from the mounting member;

an aperture through a thickness of the arm adjacent a distal end of the arm; and a pivot connection between the distal end of the arm and the bracket.

28. A holder, comprising:
a body with two prongs, each prong from the two prongs having a distal end;
a hollow interior defined by the two prongs;
an opening between distal ends, the opening being in an open communication with the hollow interior;
a first threaded protrusion on a distal end of one prong from the two prongs;
a second threaded protrusion on a distal end of another prong from the two prongs; and
a third threaded protrusion on an exterior surface of the body.

\* \* \* \* \*